(12) United States Patent
Roan et al.

(10) Patent No.: US 11,624,472 B1
(45) Date of Patent: Apr. 11, 2023

(54) SYSTEM FOR SUPPORTING AN ELONGATED MEMBER

(71) Applicant: Art Guild, Inc., West Deptford, NJ (US)

(72) Inventors: Joseph Michael Roan, Media, PA (US); Charles C. Alpert, Rumson, NJ (US); Ivan Letinic, Ridgefield, NJ (US); Douglas Zegel, Jr., Mount Laurel, NJ (US)

(73) Assignee: Art Guild, Inc., West Deptford, NJ (US)

( * ) Notice: Subject to any disclaimer, the term of this patent is extended or adjusted under 35 U.S.C. 154(b) by 0 days.

(21) Appl. No.: 17/396,365

(22) Filed: Aug. 6, 2021

(51) Int. Cl.
*F16M 11/04* (2006.01)
*A47F 5/13* (2006.01)
*F16M 11/16* (2006.01)
*F16M 13/02* (2006.01)

(52) U.S. Cl.
CPC ........... *F16M 11/04* (2013.01); *A47F 5/13* (2013.01); *F16M 11/16* (2013.01); *F16M 13/02* (2013.01)

(58) Field of Classification Search
CPC ........ F16M 11/04; F16M 11/16; F16M 13/02; A47F 5/13
See application file for complete search history.

(56) References Cited

U.S. PATENT DOCUMENTS

| 446,640 | A | * | 2/1891 | Dennis | E06B 9/50 |
| | | | | | 248/268 |
| 544,166 | A | * | 8/1895 | Gregory | A47H 1/142 |
| | | | | | 248/264 |
| 805,570 | A | * | 11/1905 | Maldaner | E06B 9/323 |
| | | | | | 182/228.4 |
| 1,227,019 | A | * | 5/1917 | Thompson | E06B 9/323 |
| | | | | | 248/264 |
| 1,752,683 | A | * | 4/1930 | Meagher | A24B 1/08 |
| | | | | | 248/251 |
| 2,443,149 | A | * | 6/1948 | Rundell | A47G 1/1613 |
| | | | | | 248/264 |
| 2,657,894 | A | * | 11/1953 | Sklenar | F25D 23/067 |
| | | | | | 248/222.12 |
| 3,062,157 | A | * | 11/1962 | Woods | B60P 7/06 |
| | | | | | 403/264 |
| 3,570,412 | A | * | 3/1971 | Holman, Jr. | B60P 7/15 |
| | | | | | 211/105.6 |
| 3,738,650 | A | * | 6/1973 | Ossenkop | A63B 21/1627 |
| | | | | | 248/265 |
| 3,865,336 | A | * | 2/1975 | Robertson | A47B 61/00 |
| | | | | | 108/29 |
| 3,891,091 | A | * | 6/1975 | Anderson | A47H 1/144 |
| | | | | | 211/105.3 |

(Continued)

*Primary Examiner* — Eret C McNichols
(74) *Attorney, Agent, or Firm* — Volpe Koenig

(57) ABSTRACT

A system for supporting an elongated member with the combination of a base and a collar. The base is configured with an angular portion that extends inwardly and downwardly from an upper edge of the base to a pivot position located between the cavity and a recess that is opposite to the angular portion and configured to receive the elongated member. The collar has an enclosure configured to receive and retain a second end of the elongated member. The base and the collar have respective exterior portions that are configured for attachment to structural elements.

3 Claims, 15 Drawing Sheets

(56) References Cited

U.S. PATENT DOCUMENTS

| | | | | |
|---|---|---|---|---|
| 4,405,127 A * | 9/1983 | Miller | A63B 1/005 | 482/40 |
| 4,509,881 A * | 4/1985 | Welch | E04F 11/1842 | 256/65.14 |
| 4,688,686 A * | 8/1987 | Mitts | A47B 49/006 | 211/183 |
| 4,700,918 A * | 10/1987 | Andrasko, Jr. | A47K 3/001 | 248/251 |
| 5,127,528 A * | 7/1992 | Cone | A47F 7/08 | 211/163 |
| 5,197,642 A * | 3/1993 | Cortelli | B62D 33/0273 | 224/403 |
| 5,894,610 A * | 4/1999 | Winter | A47K 3/38 | 285/46 |
| 6,845,955 B1 * | 1/2005 | Hsu | A47K 3/38 | 248/200.1 |
| 7,167,103 B2 * | 1/2007 | Warren | G09F 27/007 | 40/607.01 |
| 7,346,940 B1 * | 3/2008 | Liao | A47K 3/38 | 4/557 |
| 7,762,508 B2 * | 7/2010 | Xu | A47K 3/38 | 248/251 |
| 7,946,543 B2 * | 5/2011 | Cotter | A47B 61/00 | 248/326 |
| 8,069,508 B2 * | 12/2011 | O'Connell | A47K 3/38 | 248/265 |
| 8,157,231 B2 * | 4/2012 | Shiu | G02B 27/283 | 242/598.5 |
| 8,214,938 B2 * | 7/2012 | Hanley | A47K 3/38 | 248/261 |
| 8,459,474 B2 * | 6/2013 | Sagel | A47B 49/006 | 211/144 |
| 8,528,753 B2 * | 9/2013 | Woolley, II | A47H 1/102 | 211/105.3 |
| 8,613,152 B2 * | 12/2013 | Suciu | G09F 15/0037 | 40/606.12 |
| 8,806,670 B2 * | 8/2014 | O'Connell | A47K 3/38 | 248/265 |
| 8,978,228 B2 * | 3/2015 | Didehvar | A47K 3/38 | 29/434 |
| 8,991,625 B2 * | 3/2015 | Bucklew | A47H 1/102 | 211/105.3 |
| 9,271,592 B2 * | 3/2016 | Didehvar | A47H 1/142 | |
| 9,271,593 B1 * | 3/2016 | Chang | A47K 3/38 | |
| 9,427,612 B1 * | 8/2016 | Swanson | A63B 21/16 | |
| 9,538,861 B2 * | 1/2017 | Young | A47F 5/04 | |
| 9,554,674 B2 * | 1/2017 | Forrest | A47K 3/38 | |
| 10,051,985 B2 * | 8/2018 | Jones | A47H 1/122 | |
| 10,327,545 B2 * | 6/2019 | McPhillips | A47B 47/0091 | |
| 10,694,844 B1 * | 6/2020 | Smed | A47B 73/002 | |
| 10,702,086 B1 * | 7/2020 | Sayed | A47H 1/142 | |
| 11,164,487 B1 * | 11/2021 | Roan | G09F 15/0037 | |
| 11,222,558 B2 * | 1/2022 | Wicken | G09F 15/0037 | |
| 11,317,752 B2 * | 5/2022 | Arnold | A47H 1/102 | |
| 11,445,821 B2 * | 9/2022 | Sagel | A47B 49/006 | |
| 2003/0164431 A1 * | 9/2003 | Kanashiki | G09F 15/0037 | 248/157 |
| 2009/0020671 A1 * | 1/2009 | Xu | A47K 3/38 | 4/558 |
| 2011/0147326 A1 * | 6/2011 | Woolley, II | A47K 3/38 | 211/105.6 |
| 2012/0145661 A1 * | 6/2012 | Fernandez | A47B 96/06 | 248/251 |
| 2021/0256884 A1 * | 8/2021 | Reiner | G09F 15/0062 | |
| 2022/0270524 A1 * | 8/2022 | Innis | G09F 15/0018 | |

* cited by examiner

_US 11,624,472 B1_

SYSTEM FOR SUPPORTING AN ELONGATED MEMBER

FIELD OF INVENTION

The present invention relation generally to the field of support an elongated member in a vertical position. More particularly, the invention relates to an elongated member or pole that serves as support for another object. Most particularly, the invention relates to an elongated member or pole that serves as support for product display.

BACKGROUND

Product displays have taken many forms over the years and a consistent problem with the displays is the time and effort needed to assembly and place the display. Many display systems have a predefined shape of geometric configuration that makes it difficult to change the display. The difficulties associated with changing the display, particularly those with a fixed configuration, add a significant cost element and may result in a decision to avoid changing a display.

SUMMARY

The present invention addresses the prior art shortcomings by providing a system for supporting a display that is adjustable so it can accommodate displays with different sizes and different display material. In addition, the support system enables pre-assembly of a display module before it is set in the desired location. Still further, the support system can accommodate display with different lengths and widths.

DETAILED DESCRIPTION OF THE PREFERRED EMBODIMENTS

Figure 1:
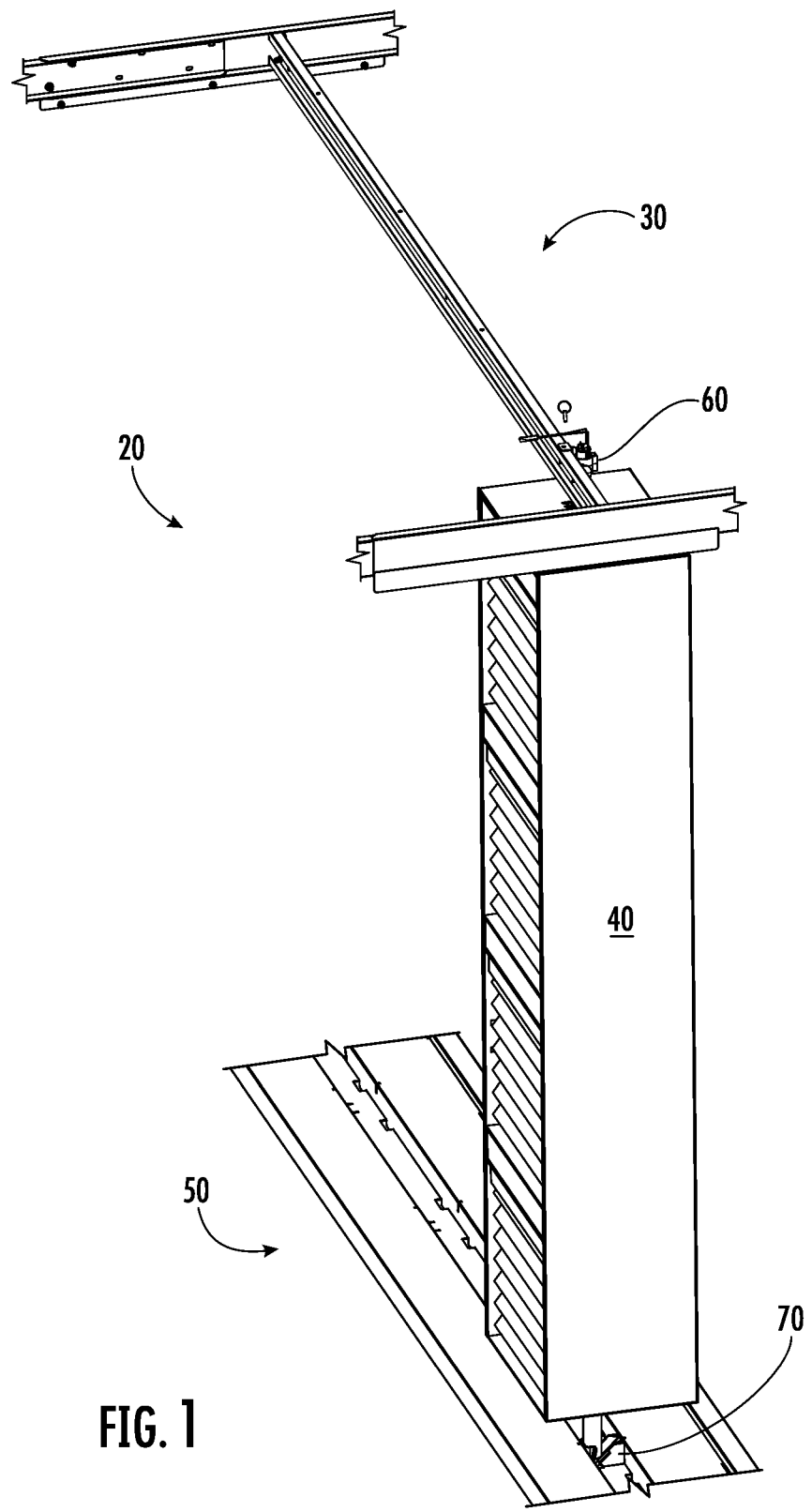
FIG. 1 illustrates a display that is secured in place with a support system according to the invention.

FIG. 1 illustrates a display assembly 20 where the display 40 is secured to an upper support 30 and a lower support 50 with a collar 60 and base 70 according to the invention.

Figure 2:
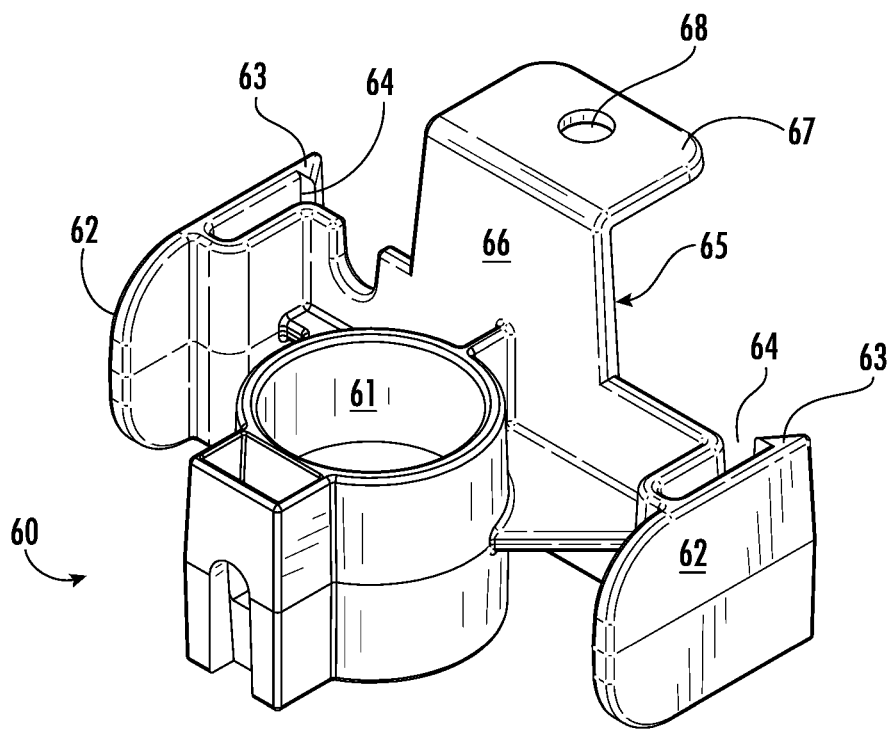
FIG. 2 is a front perspective view of a preferred collar according to the invention.
Figure 3:
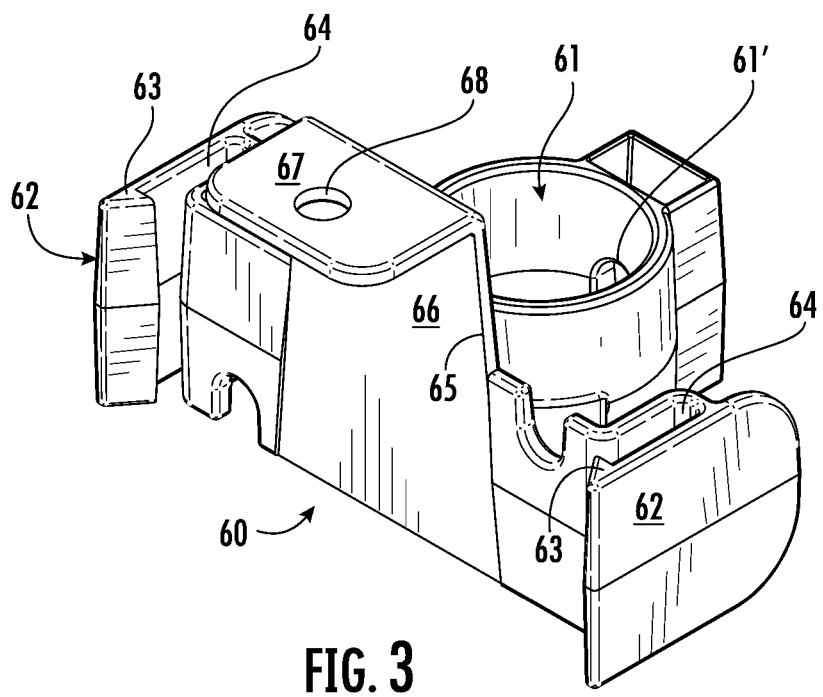
FIG. 3 is rear perspective of the preferred collar member in FIG. 2.
Figure 10:
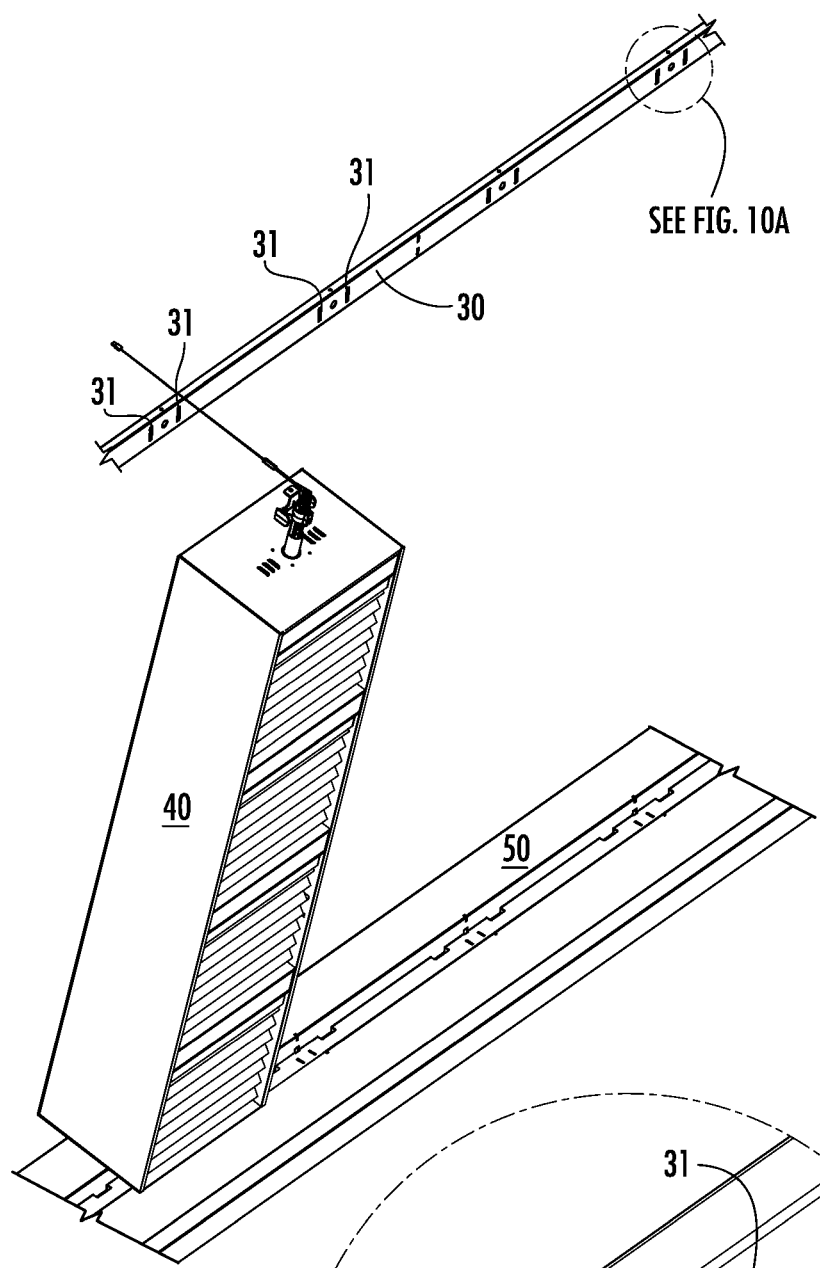
FIG. 10 illustrated how a display mounted on an elongated member with a collar according to the invention is secured an upper support structure.
Figure 10A:
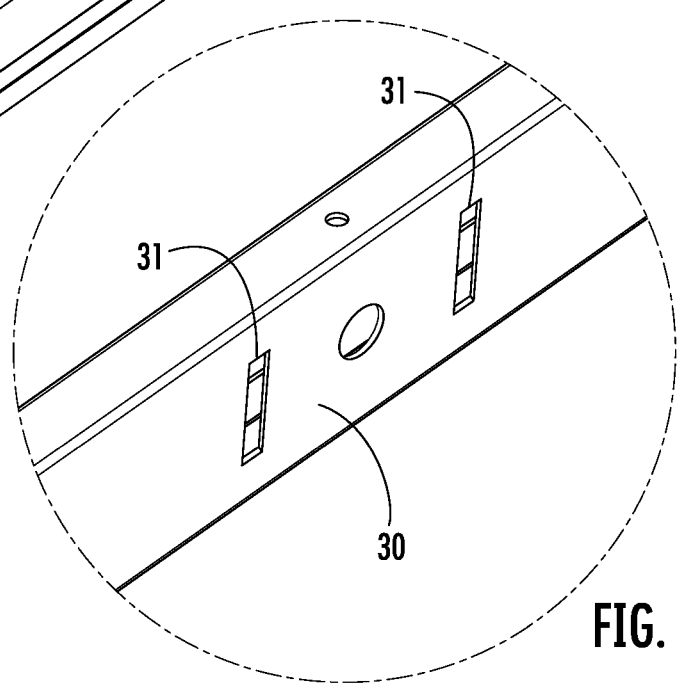
FIG. 10A is an enlarged view of the encircled area in FIG. 10.
Figure 11:
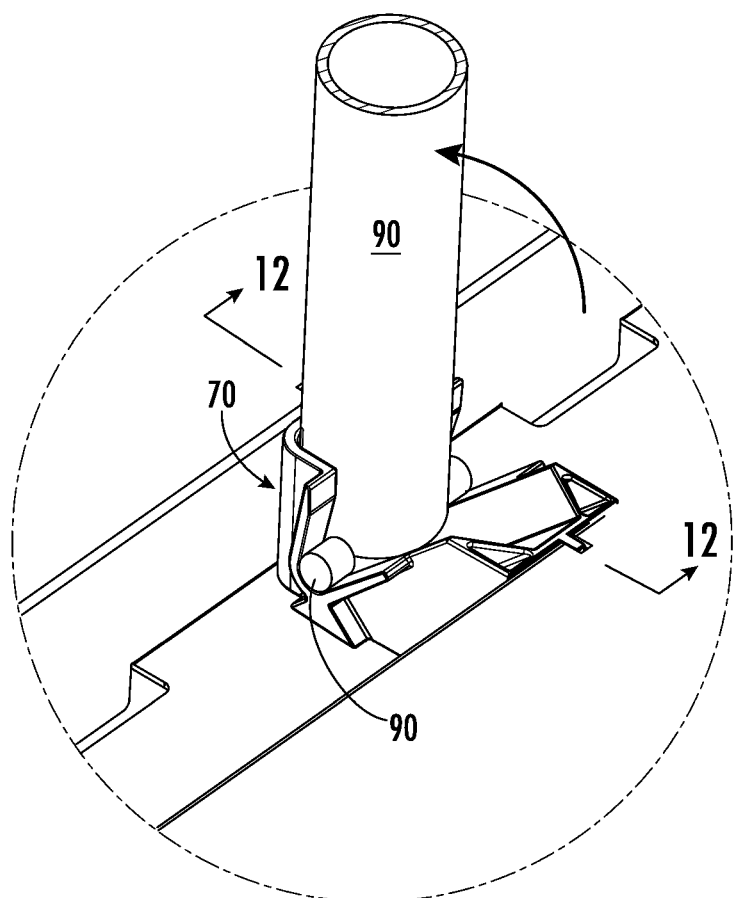
FIG. 11 illustrates the final position of the elongated member in a base according to the invention.
Figure 12:
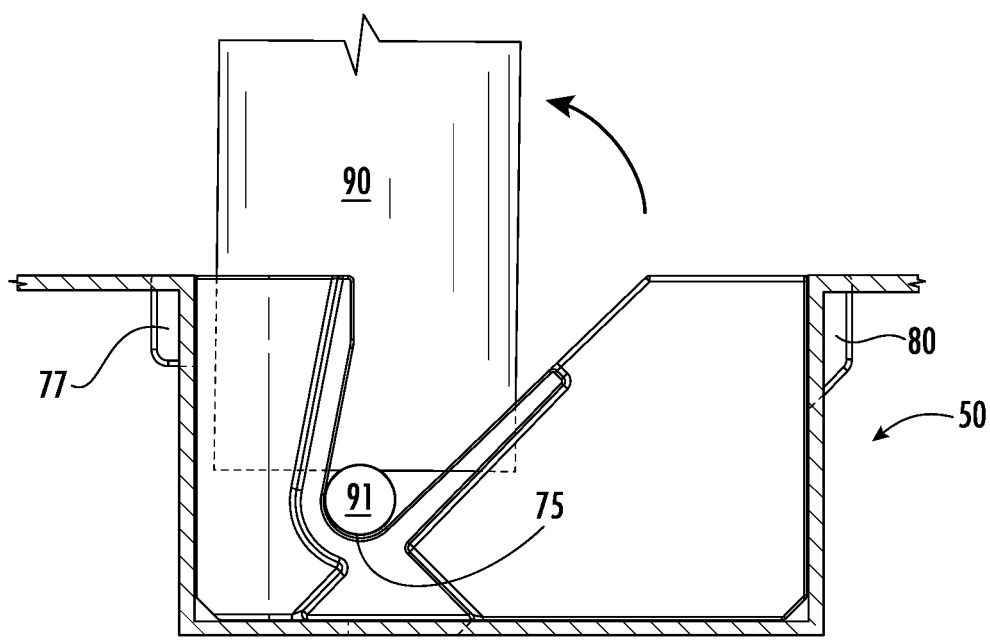
FIG. 12 is a section along the line 12-12 in FIG. 11.
Figure 13:
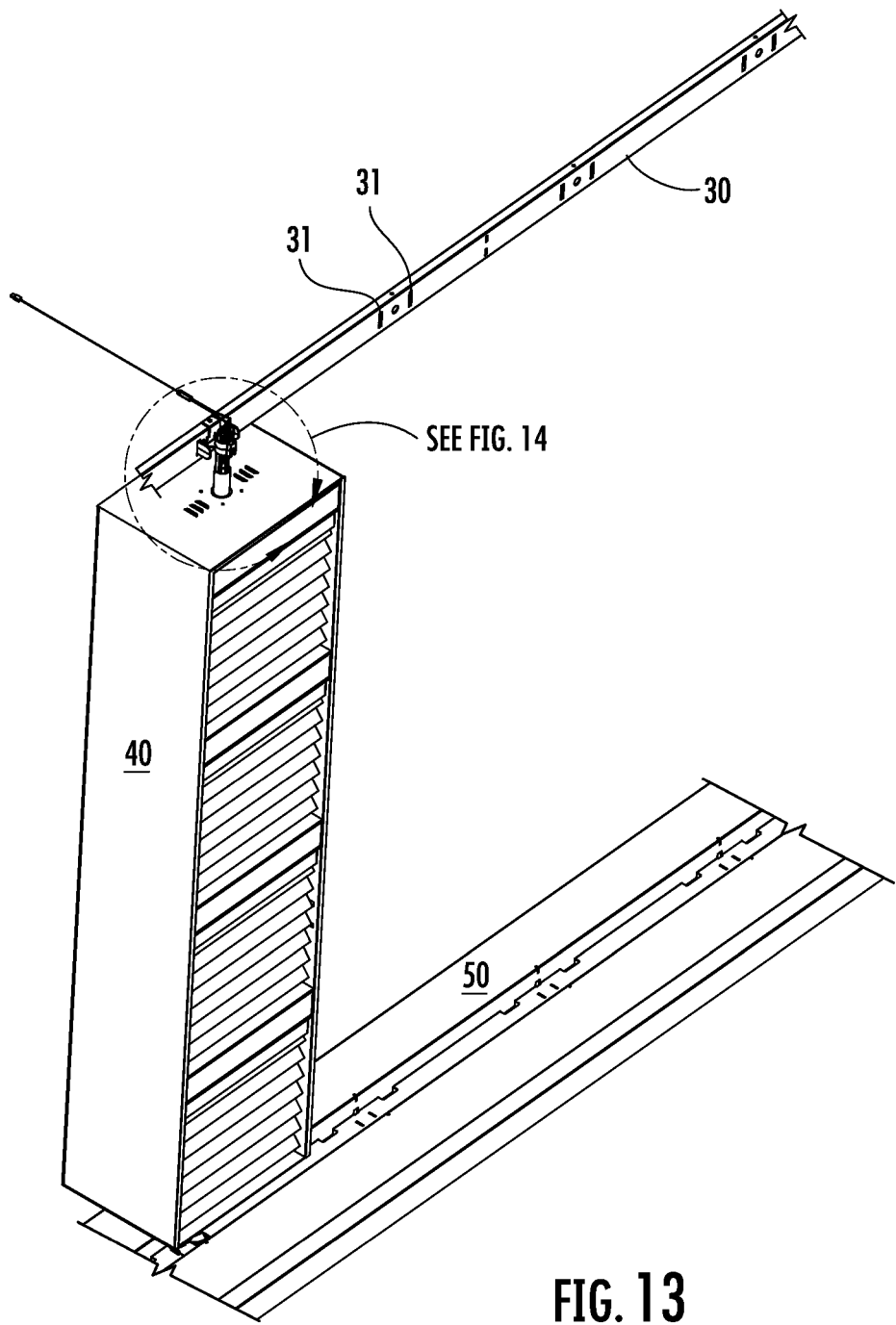
FIG. 13 illustrated the display in a final position.
Figure 14:
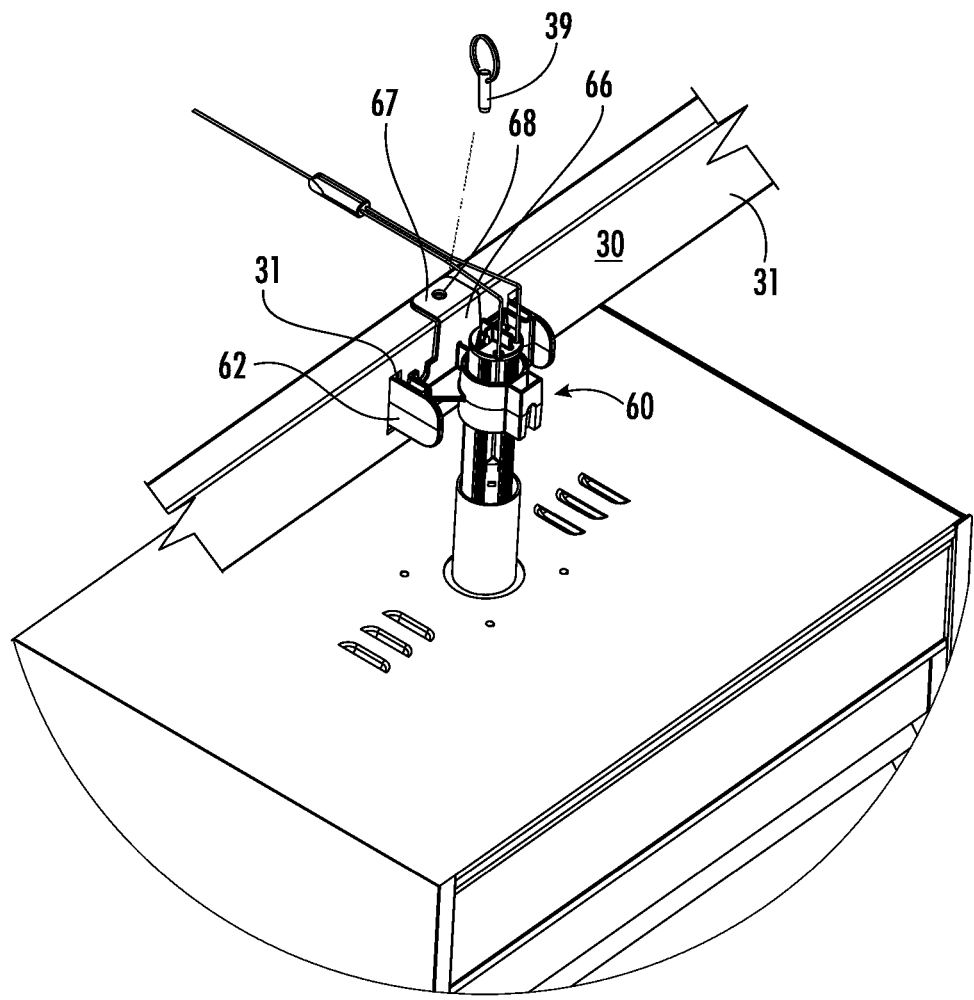
FIG. 14 illustrates the application of a pin to further secure the collar and the position of an optional electric supply to the elongated member.
Figure 15:
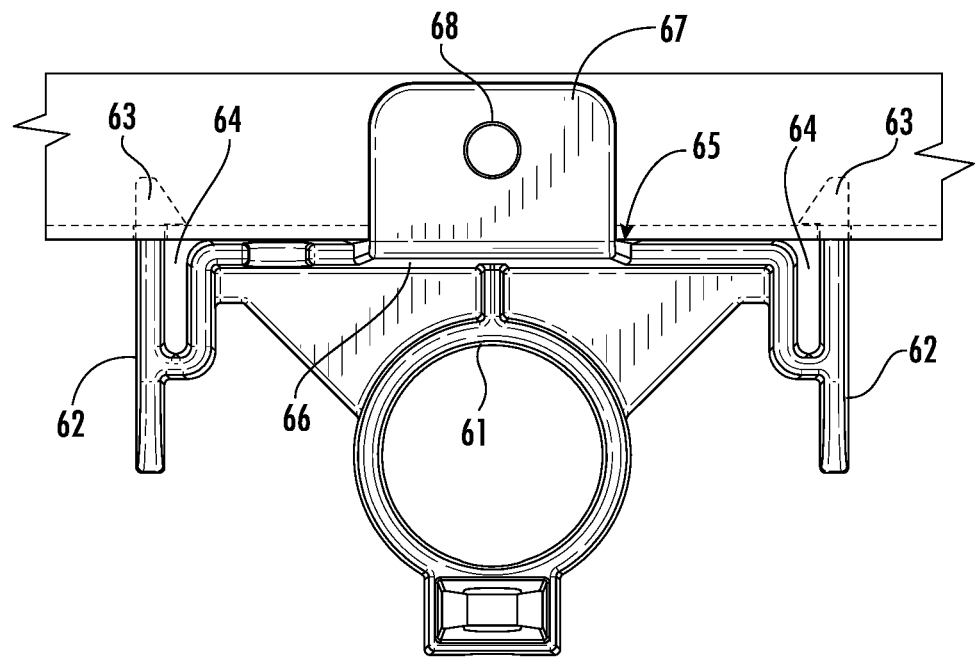
FIG. 15 is a top plan view of the preferred base according to the invention.
Figure 16:
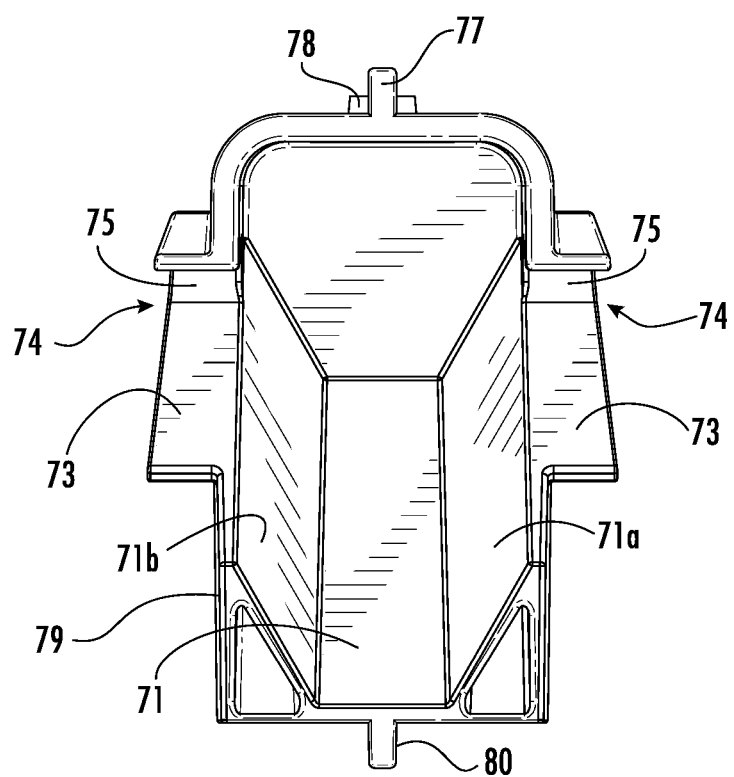
FIG. 16 is a top plan view of the preferred collar according to the invention.

With reference to FIGS. 2 and 3, the collar 60 will be described in more detail. The collar 60 has an enclosure 61 that is configured to receive and hold a portion of an elongated member that is associated with a display 40 to an upper support 30. In the currently preferred embodiment, the enclosure 61 is circular and has an aperture 61' for passing a locking fastener into the enclosure. The locking fastener will hold a circular elongated member in place and prevent rotation if the display is rotated. If the elongated member in non-circular and the enclosure 61 has a complement shape, the use of a fastener can be eliminated. The collar 60 has two side wings 62. Each wing 62 is flexible and has a locking tab 63 that passes through a slot 31 and springs behind the upper support 30, see FIGS. 10 and 14, to secure an elongated member to the upper support 30. 60 includes a gap 64 that is provided between the brace 65 and the respective wing 62. The brace 65 includes a vertical wall 66 and a horizontal projection 67. The horizontal projection 67 has an opening 68 through which a locking pin 39 passes and into the opening 33 in upper support 30.

Figure 4:
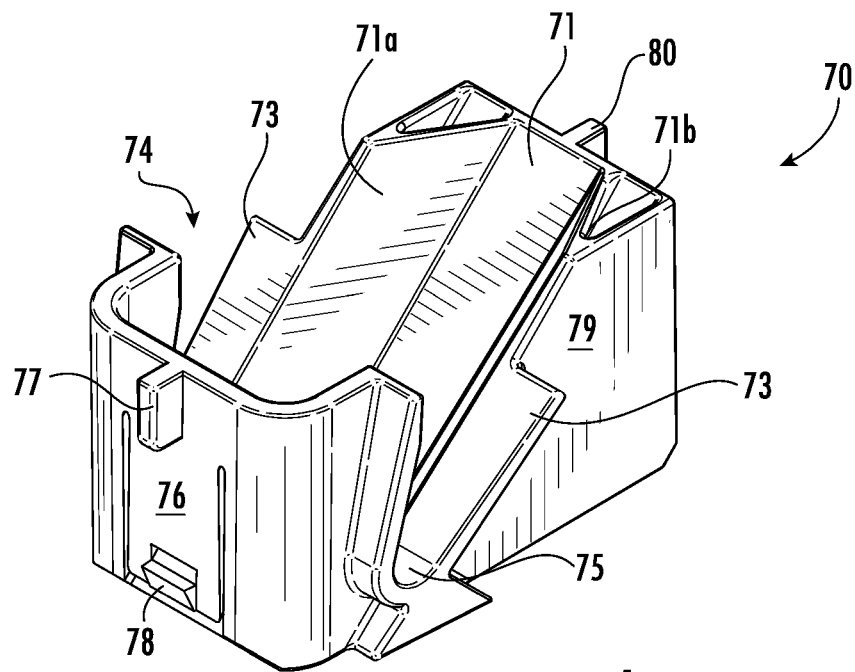
FIG. 4 is a front perspective view of a preferred base according to the invention.
Figure 5:
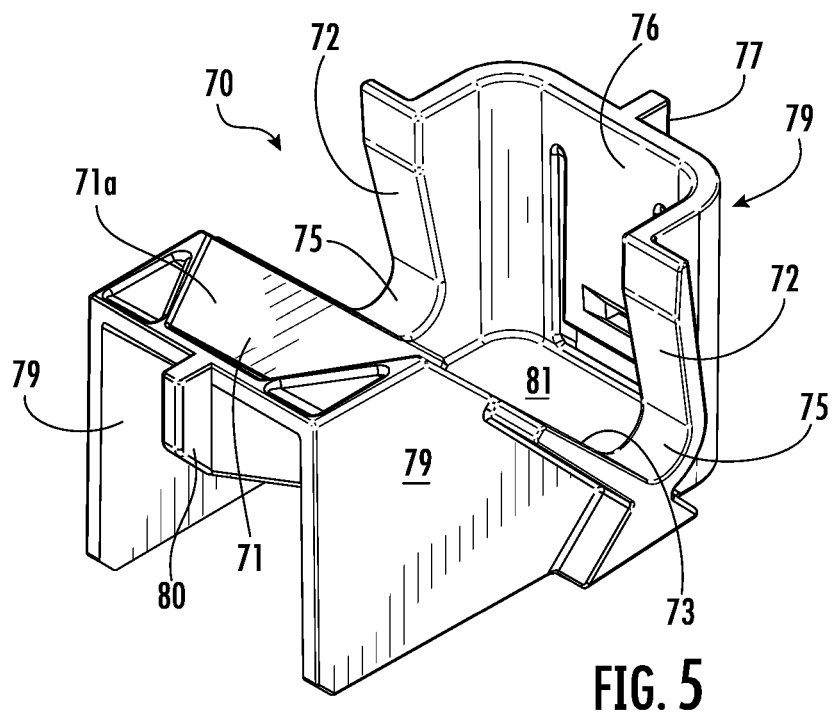
FIG. 5 is rear perspective of the preferred base in FIG. 4.
Figure 6:
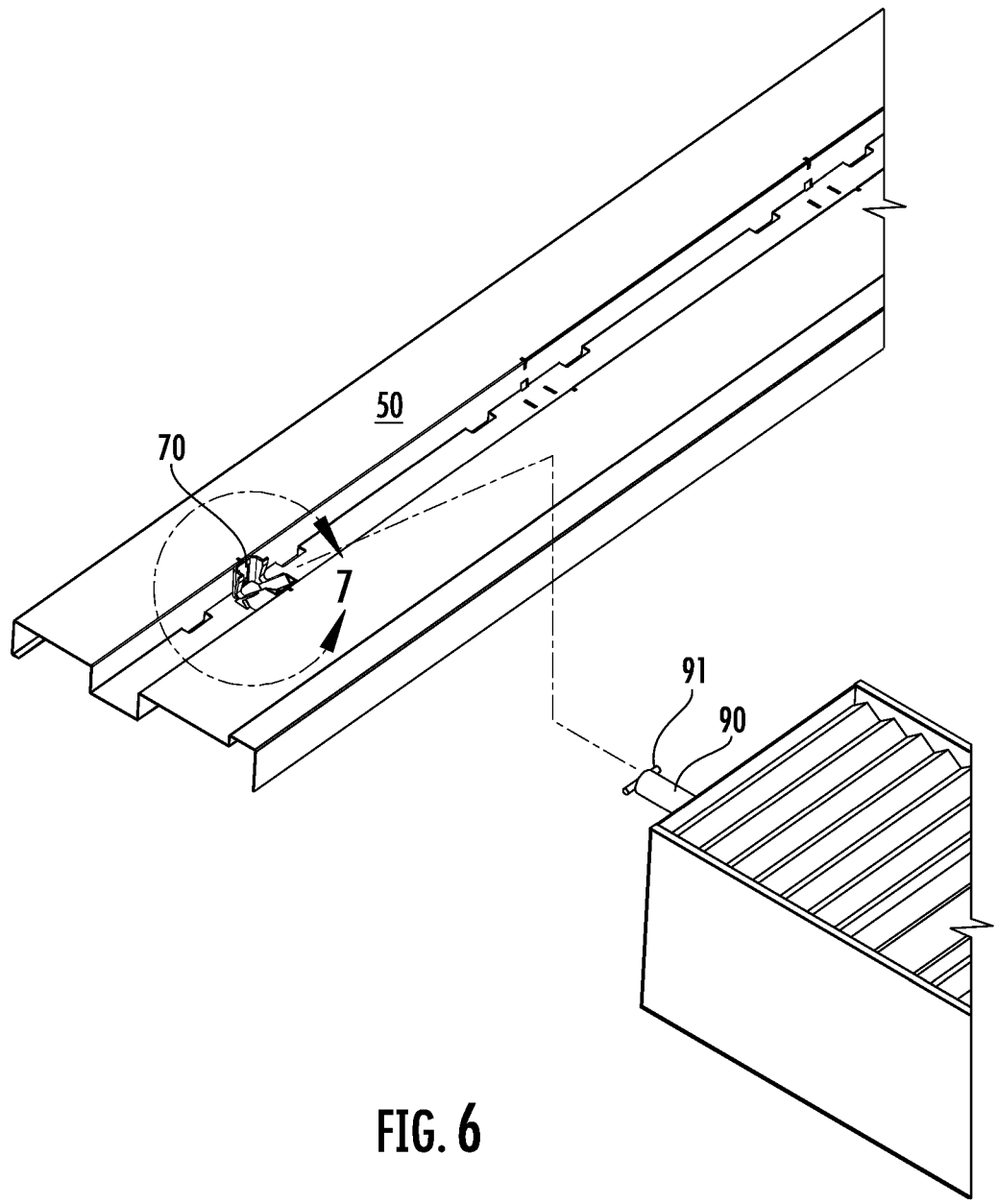
FIG. 6 illustrated how a display mounted on an elongated member is secured in a base according to the invention.
Figure 7:
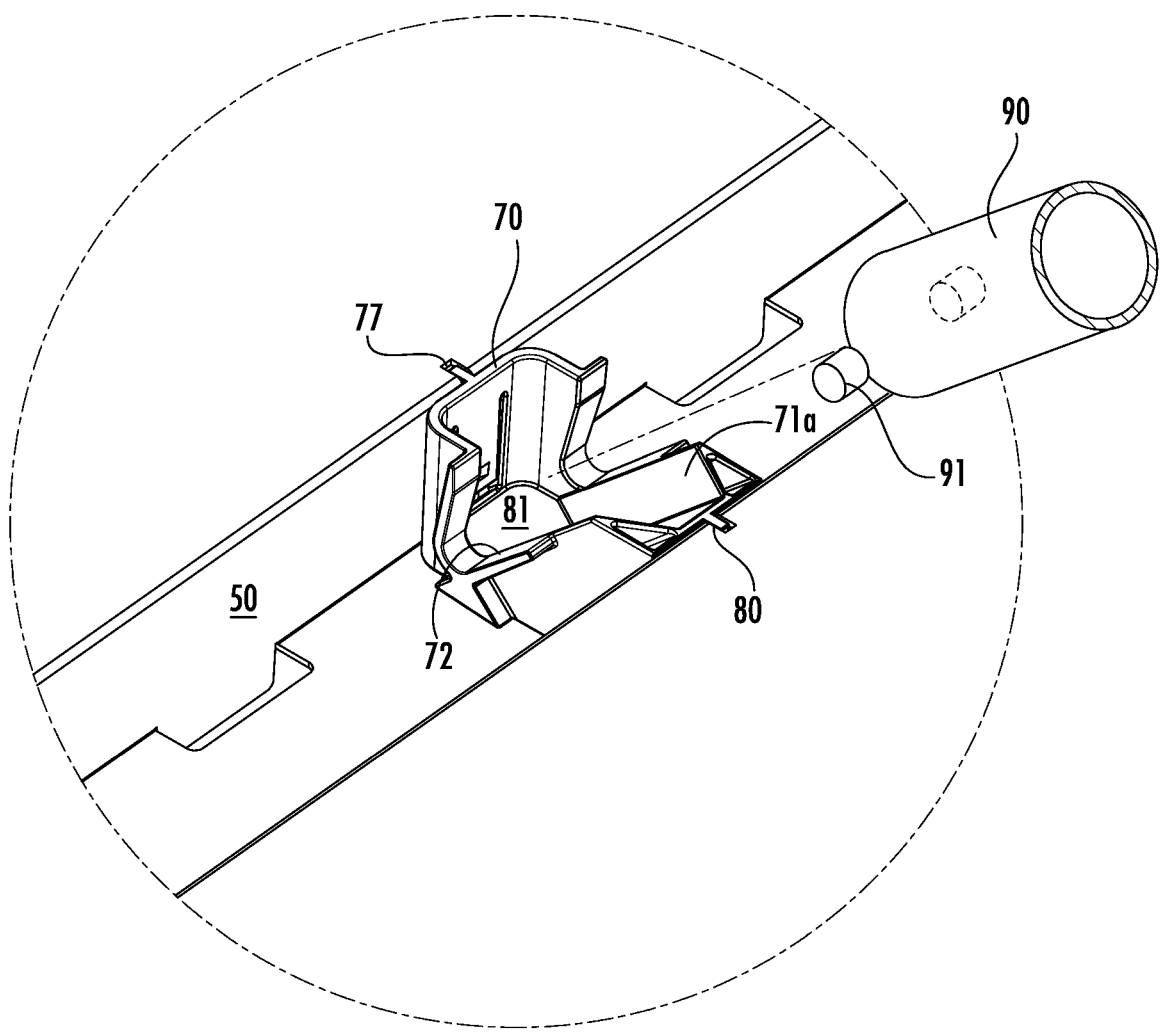
FIG. 7 is an exploded view illustrating the assembly of a tubular elongated member as it is addressed to a base according to the invention.
Figure 8:
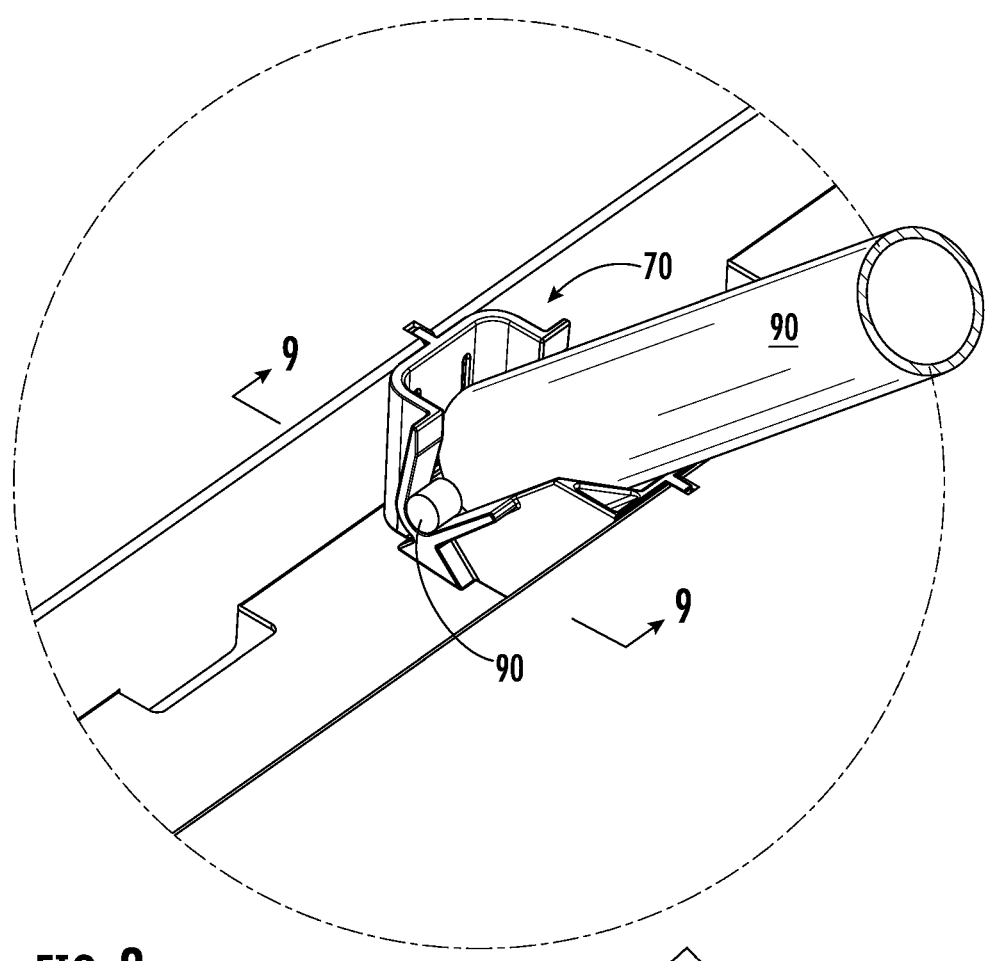
FIG. 8 illustrates the initial position of the elongated member in the base.
Figure 9:
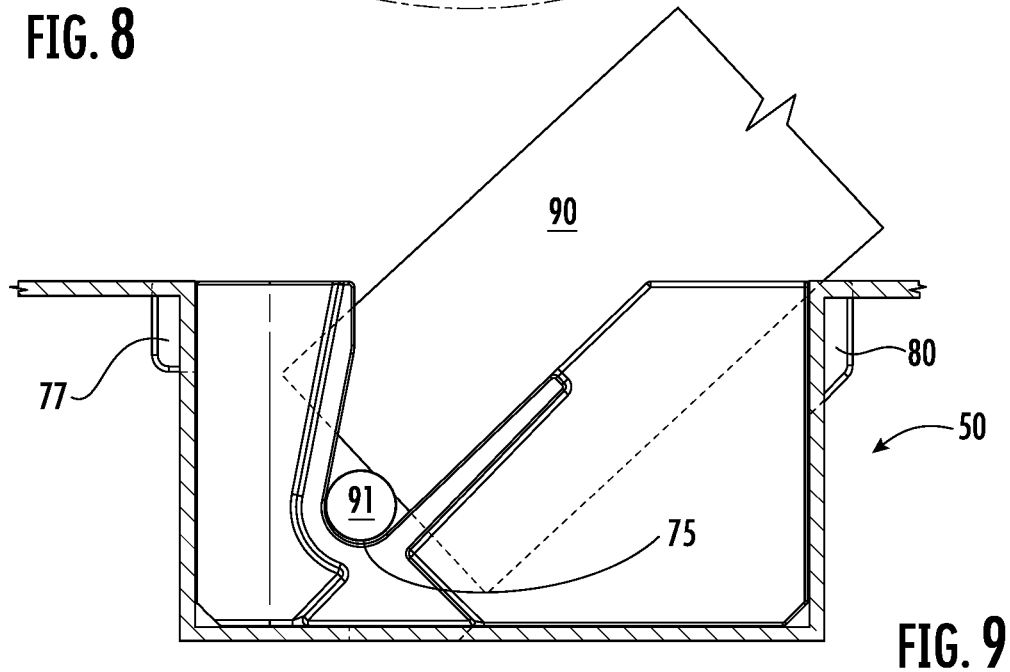
FIG. 9 is a section along the line 9-9 in FIG. 8.

With reference to FIGS. 4 and 5, the base 70 will be described in more detail. The base 70 has a ramp or inclined surface 71 that extends inwardly from an upper horizontal edge between the side walls 79 to a pivot position 75 that is between the guides 72 and 73. The guides are positioned beside the ramp 71 to complement the ramp 71 in guiding the elongated member into the recess 76 and the pivot location 75, see FIGS. 8 and 9. The base 70 has projections 77 and 80 that align with slots in the lower support 50 for positing the base 70 along the lower support 50 and a locking projection 78 that extends from the outside of the wall defining the recess 76 passes into a slot in a wall of the lower support 50.

With reference to FIGS. 6 through 12, it can be seen how the base 70 enables an elongated member, preferable with an attached display 40, to be installed and removed through alignment with the base and rotation between the angled ramp 71 and the upright position in recess 76. In a preferred embodiment, the elongated member 90 is tubular and dimensioned to fit with the space defined by the ramp 71 and the wings 71a and 71b, and be received with recess 76. The pin 91 is fixed to the bottom of the elongated member 90 and is dimensioned to cooperate with guides 73 and fit within the pivot position 75. The pivot position 75 is spaced from the floor 81 so there is sufficient room for the elongated member to be rotated from the ramp 71 to the set position in recess 76, see FIGS. 9, and 12 through 14. When the elongated member is in the desired position, the locking tabs 63 of the collar 60 are secured in the slots 31 in upper support 30 and a pin 39 is inserted in the opening 68 to prevent the tabs 63 from being accidently dislodged from slots 31. If it is desired to remove or modify the display on the elongated member 90, the pin 39 is removed, the locking tabs 63 are released from the slots 31 in upper support 30 and the elongated member can be rotated down control to the ramp 71.

In the preferred embodiment, upper support 30 is a rail of any desired length with one or more positions having a set of slots 31 for connecting with the locking tabs 63. The lower support 50 is generally sized in equal length with the upper support 30. However, the loser support 50 many have a greater depth according to the display's depth or, when desired, to provide a location for related information, such as product size, color, price, of the like.

With the alternative embodiments of collar 60 and base 70 in FIGS. 17 through 22, it is possible to eliminate the upper support 30, the lower support 50 or both from the display. With reference to FIGS. 17 through 22, the alternative embodiments will be described with like elements having the same element numbers as the same element in the preferred embodiments.

Figure 17:
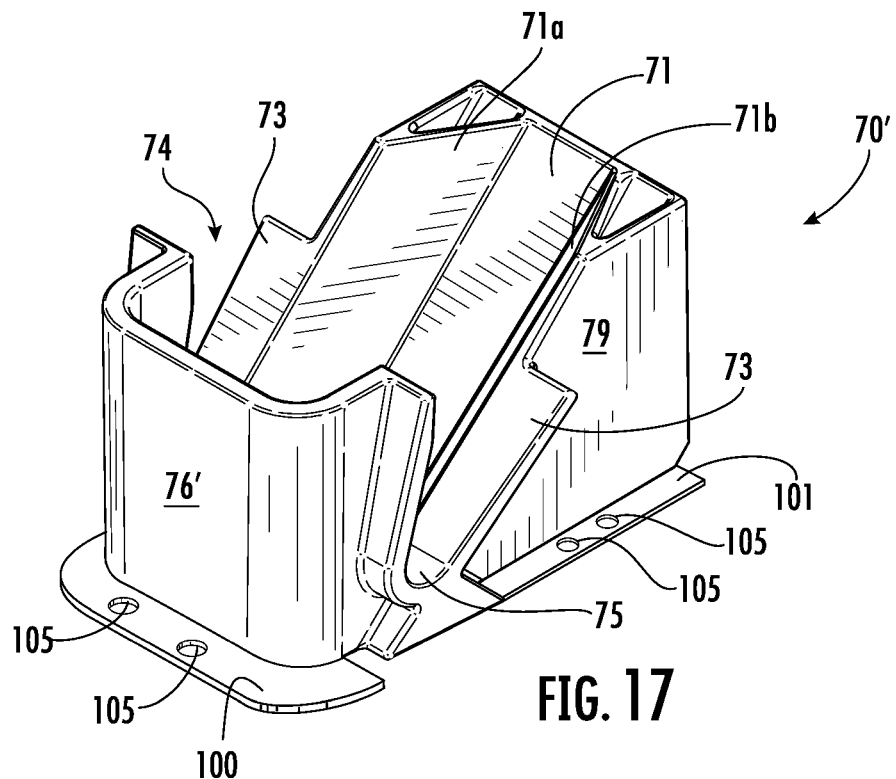
FIGS. 17 and 18 are respective front and rear perspectives of an alternative base.
Figure 18:
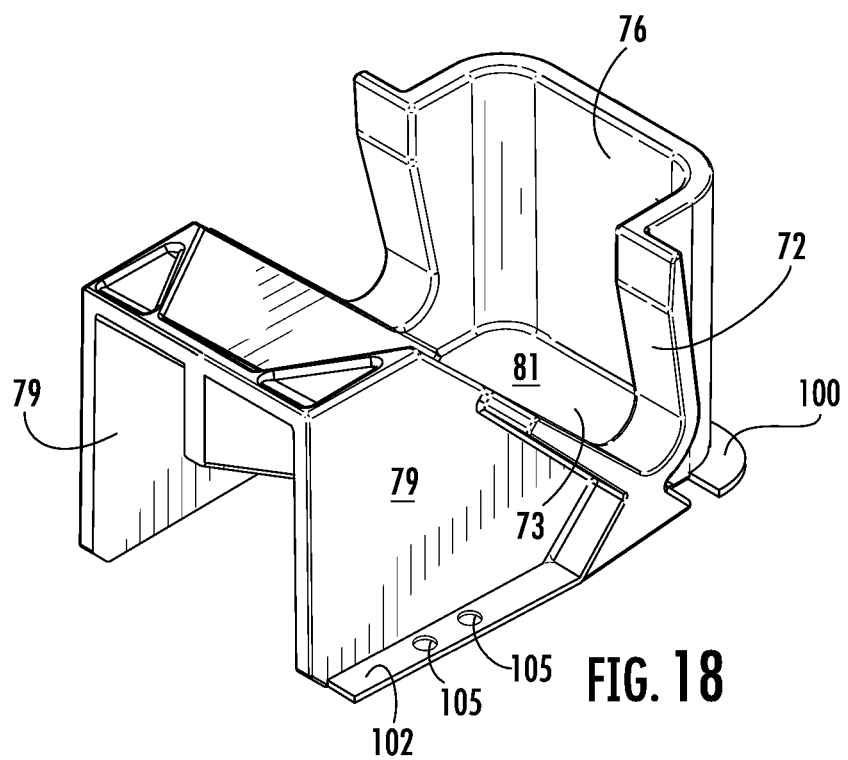

The alternative base 70' shown in FIGS. 17 and 18 does not have projections 77, 78, and 80, found in the preferred embodiment. In this alternative embodiment, base 70' is provided with lower appendages 100, 101, and 102 that have fasteners apertures 105 through which a fastener can be passed to an existing support structure, such as an existing floor in a display area.

Figure 19:
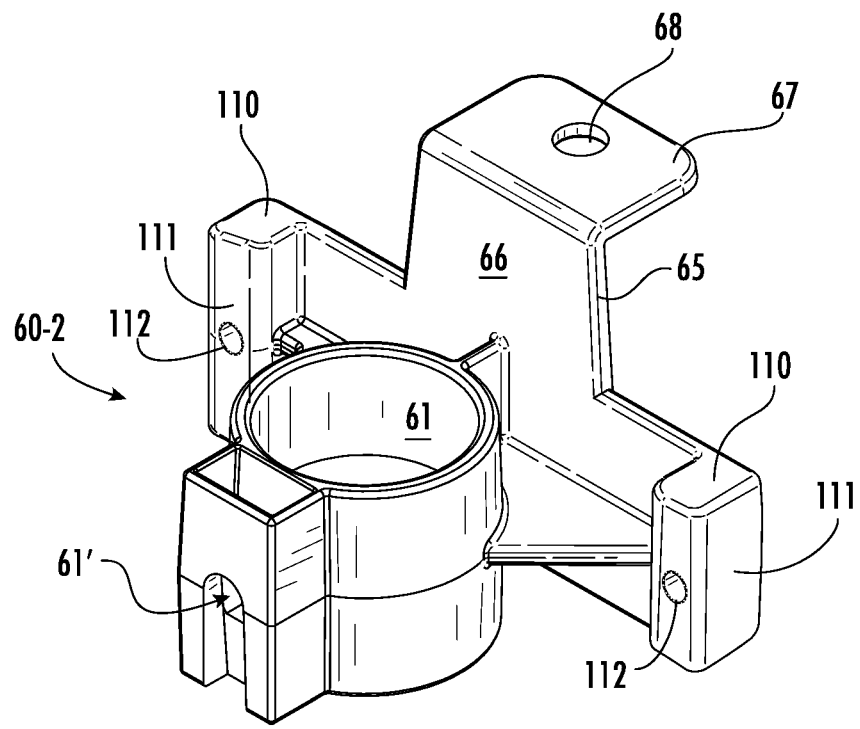
FIGS. 19 and 20 are respective front and rear perspectives of an alternative collar.
Figure 20:
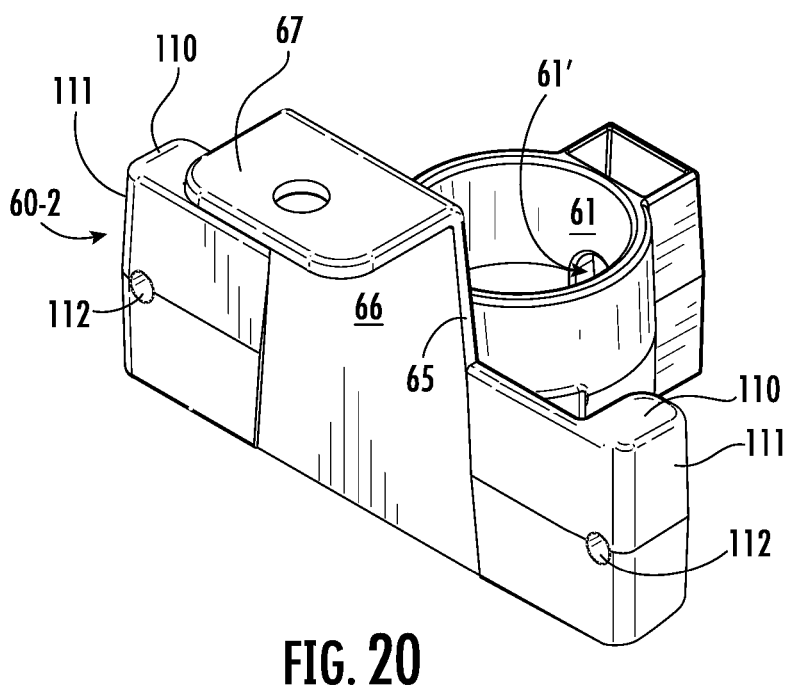
Figure 21:
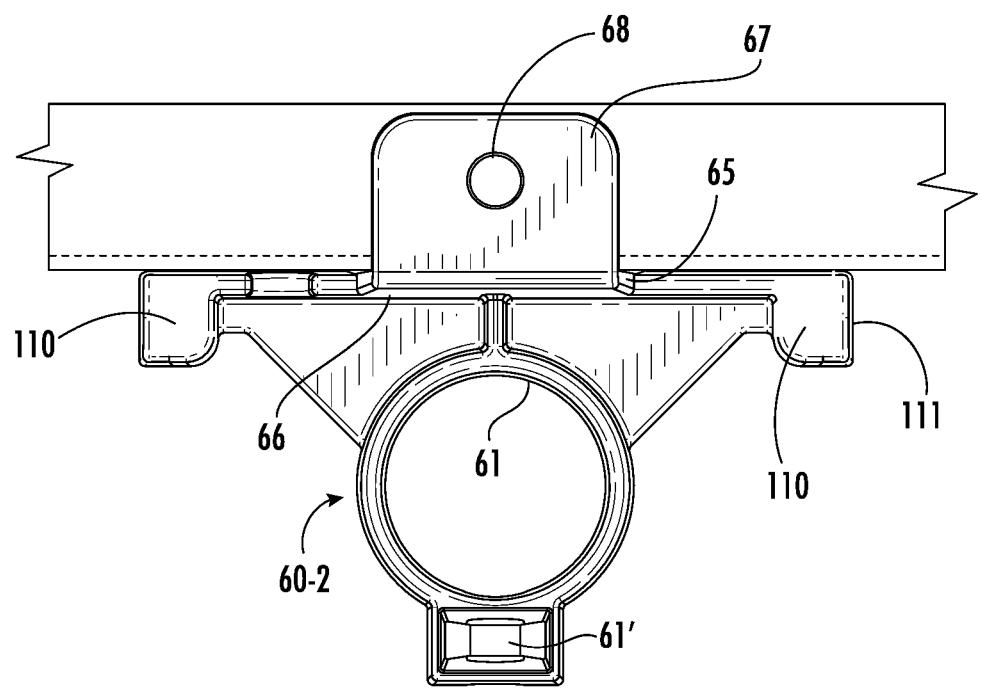
FIG. 21 is a top plan view of the alternative collar in FIGS. 19 and 20.
Figure 22:
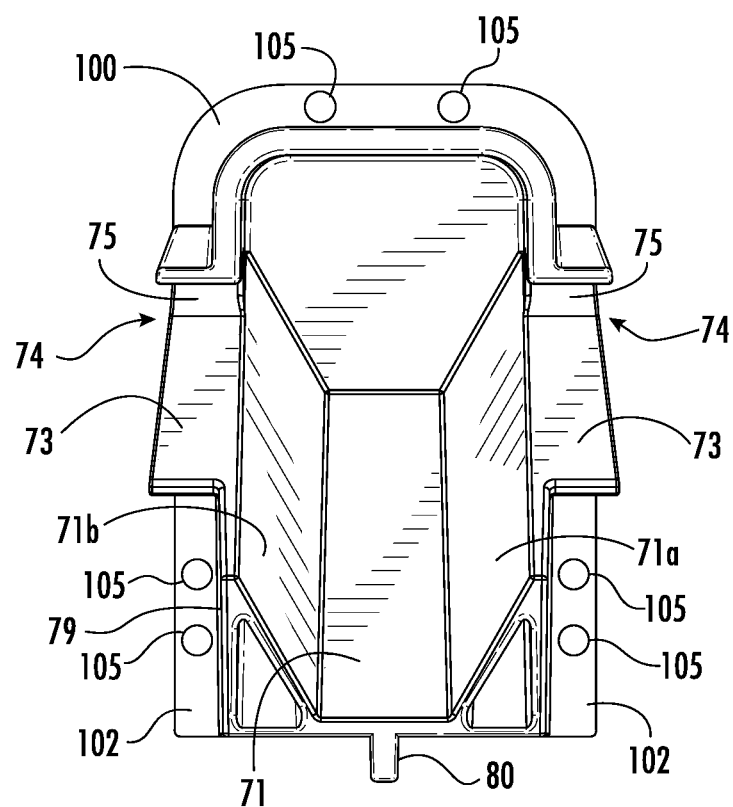
FIG. 22 is a top plan view of the alternative base in FIGS. 17 and 18
Figure 23:
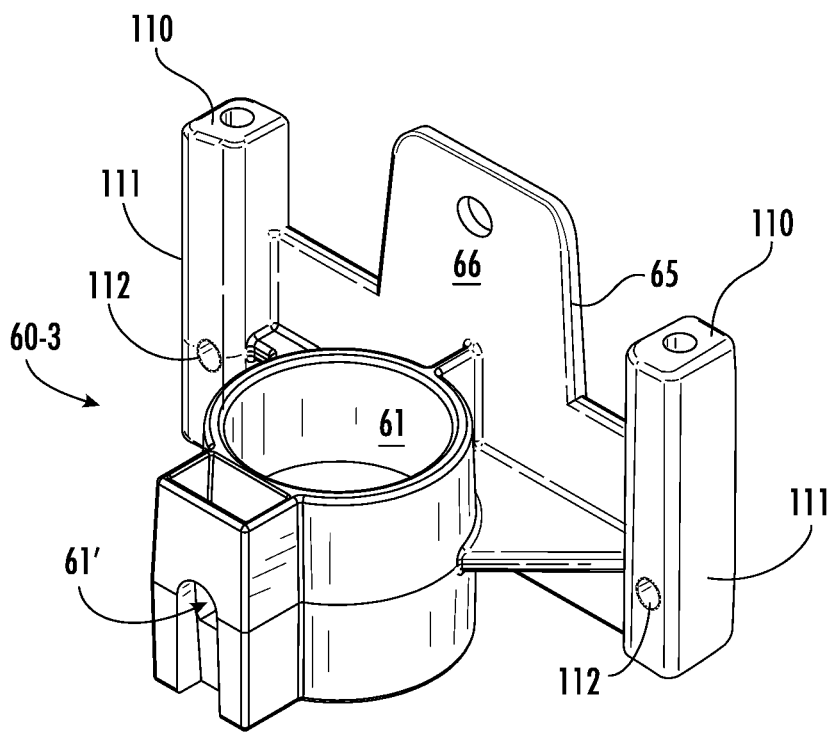
FIG. 23 is a perspective view of a second alternative collar according to the invention; and, FIG. 24 is a perspective view of a third alternative collar according to the invention.
Figure 24:
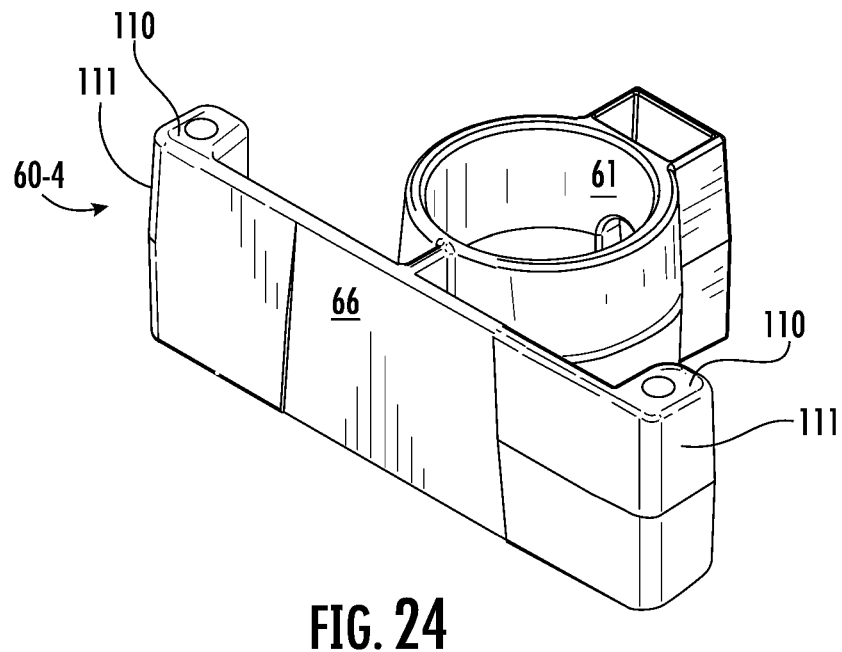

The alternative collar 60-2 shown in FIGS. 19 and 20 does not have wings 62, locking tabs 63 or gaps 64 that are found in the preferred embodiment. In this alternative embodiment of collar 60-2, the projections 110 have a thickness 11 that is selected to provide sufficient strength for passing a fastener through the apertures 112 to secure the collar to beam or an existing structure, such as a partition.

The second and third alternative embodiments, 60-3 and 60-4, of the collar do not have the horizontal projection 76 and provide for a flat attachment where necessary.

It will be appreciated that the limiting criteria for the various collars will be to provide an enclosure 61 that will secure elongated member. It will also be appreciated that the length of the elongated member will be determined by its use.

What is claimed is:

1. A system for supporting an elongated member, the system comprising:
   a base having a cavity configured for receiving an end of an elongated member, the cavity is configured with an angular portion that extends inwardly and downwardly from an upper edge of the base to a pivot position located between the cavity and a recess that is opposite to the angular portion and configured to receive the elongated member; and,
   a collar having an enclosure configured to receive and retain a second end of the elongated member;
   wherein the base and the collar each have respective exterior portions that are configured for attachment to respective structural elements.

2. A system for supporting an elongated member, the system comprising:
   a base that is configured for attachment to a first structure element, the base has a cavity that is dimensioned to receive a first end of the elongated member and includes an angular portion that extends inwardly and downwardly from an outer edge of the base to a pivot position located adjacent to a generally vertical recess that is opposite to the angular portion and dimensioned to receive the first end of the elongated member; and,
   a collar with a first portion that is dimensioned to receive a portion of the elongated member that is spaced from the first end of the elongated member and a second portion that is configured for attachment to a second structural element.

3. A method for supporting an elongated member, the system comprising:
   providing a base having a cavity configured for receiving an end of an elongated member, the cavity configured with an angular portion that extends inwardly and downwardly from an outer edge of the base to a pivot position located between the cavity and a recess that is opposite to the angular portion and configured for receiving the end of the elongated member; and,
   providing a collar having a portion configured to receive and retain a second end of the elongated member; and,
   providing the base and the collar with respective exterior portions that are each configured for attachment to respective structural elements;
   whereby the elongated member is supported on respective structural elements by the base and collar.

* * * * *